UNITED STATES PATENT OFFICE.

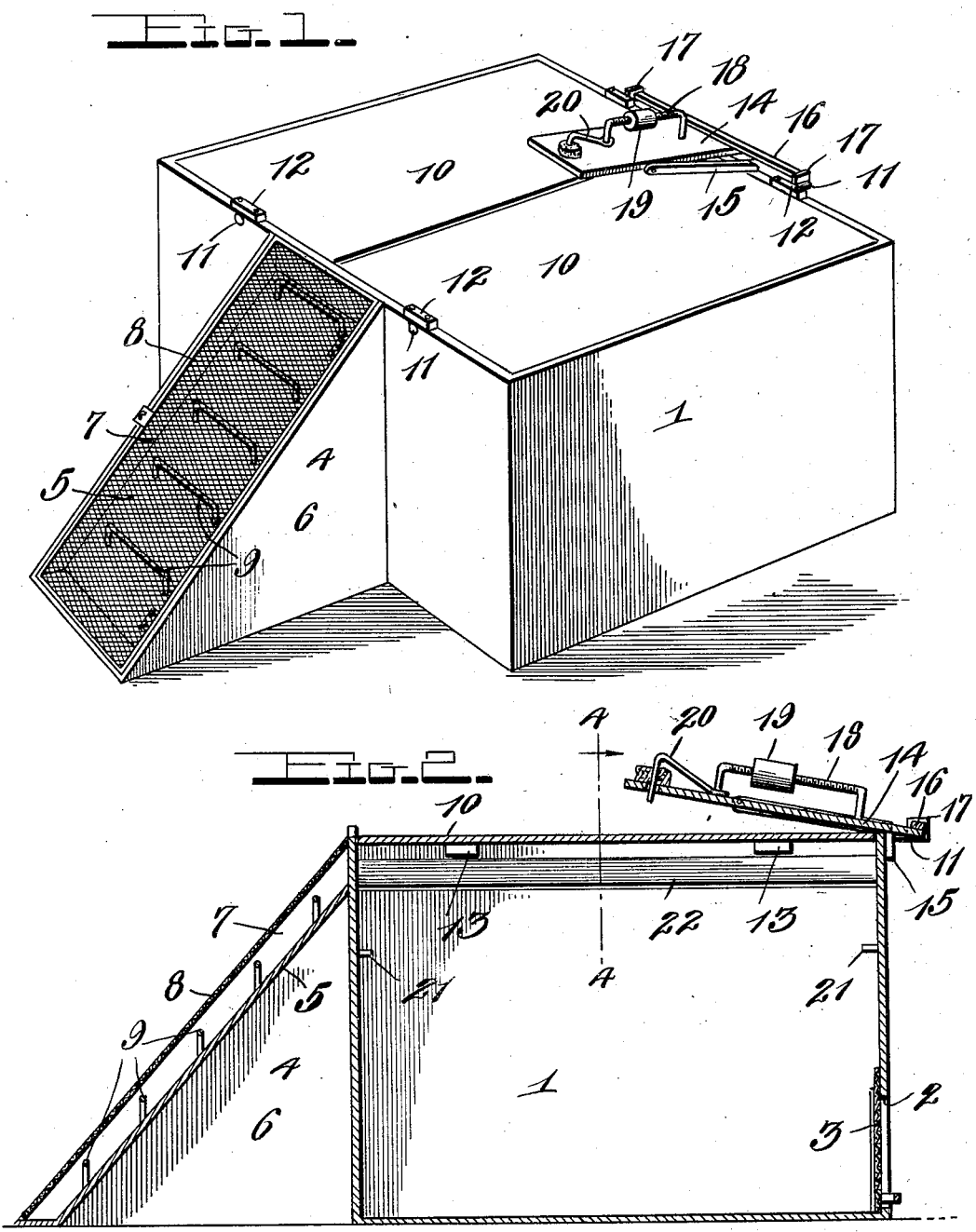

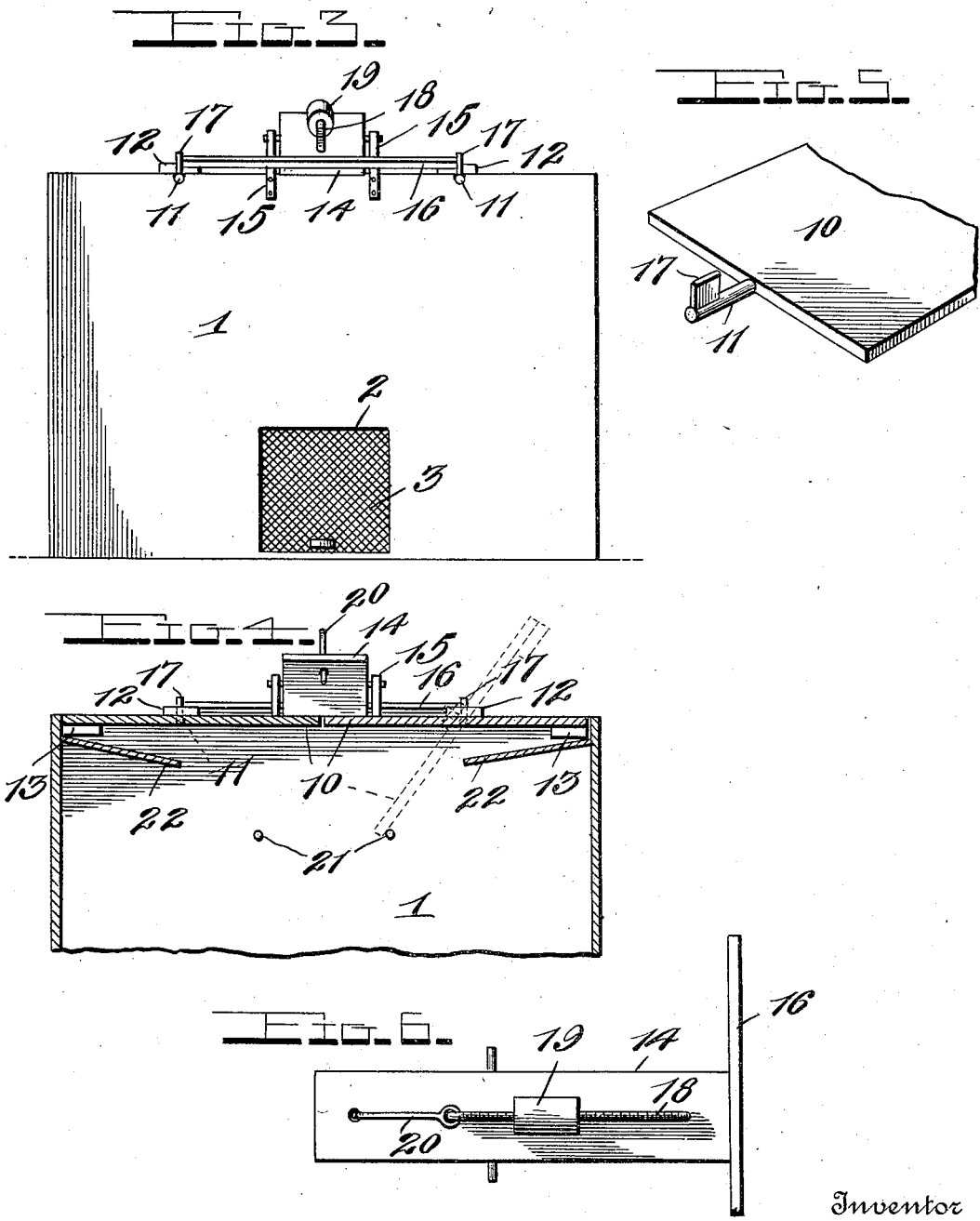

WALTER JAMES STEWART, OF RENO, NEVADA.

ANIMAL-TRAP.

1,017,479.  Specification of Letters Patent.  Patented Feb. 13, 1912.

Application filed February 23, 1911. Serial No. 610,355.

*To all whom it may concern:*

Be it known that I, WALTER JAMES STEWART, a citizen of the United States, residing at Reno, in the county of Washoe and State of Nevada, have invented certain new and useful Improvements in Animal-Traps; and I do declare the following to be a full, clear, and exact description of the invention, such as will enable others skilled in the art to which it appertains to make and use the same.

This invention relates to improvements in animal traps and particularly to the class of self and ever set traps.

One object of the invention is to provide a trap of this character having an improved construction and arrangement of operating mechanism adapted to be released by an animal in an effort to reach the bait and to be actuated by the weight of the animal whereby the latter is precipitated into the trap.

Another object is to provide means for preventing the trapped animals from escaping and means whereby the animals are attracted to a position on the trap where they will be caught when the trap is sprung.

With these and other objects in view, the invention consists of certain novel features of construction combination and arrangement of parts as will be more fully described and particularly pointed out in the appended claims.

In the accompanying drawings:—Figure 1 is a perspective view of an animal trap constructed in accordance with my invention; Fig. 2 is a vertical longitudinal sectional view of the same; Fig. 3 is a rear elevation of the trap; Fig. 4 is a vertical cross sectional view through the upper portion of the trap on the line 4—4 of Fig. 2; Fig. 5 is a detail perspective view of the rear end of one of the pivoted trap doors of the trap showing the arrangement of the stop thereon; Fig. 6 is a top plan view of the pivoted bait holder and trap door releasing mechanism.

In the embodiment of the invention I provide a box or receptacle 1 which may be of any suitable size and shape and which is here shown as of rectangular form. In the rear side of the box 1 is formed a discharge opening 2 which is covered by a screen door 3. The door 3 is preferably arranged to slide upwardly when opened. On the front side of the box is arranged an incline 4 up which the animals climb to reach the top of the box. The incline 4 is in the form of a triangular shaped frame the outer inclined side 5 of which is set in below the inclined upper edges of the vertical sides 6, thereby forming a shallow compartment 7 over which is arranged a screen door 8 said door being preferably hinged to the upper edge of one of the sides 6 and fastened to the edge of the other side, as shown. On the inclined side 5 forming the bottom of the compartment 7 are arranged a series of wire cleats 9 which are provided to support pieces of bait whereby an animal will be attracted and led up the incline to the top of the trap. The top of the box is closed by two trap doors 10 which are pivotally supported at their ends by centrally disposed pintles 11. The pintles 11 are pivotally engaged with bearings 12 formed in the upper edges of the box and are adapted to tilt downwardly at their inner edges by the weight of an animal thereon. The doors are provided on the under sides of their rear ends with weights 13 whereby said doors are swung back to their normal or closed position after being opened and supported in the manner hereinafter described.

In order to prevent the doors from being tilted before an animal has reached the center of the same I provide a door holding and releasing mechanism comprising a teeter in the form of a board 14 pivotally supported over the rear portion of the meeting inner edges of the doors, between two inclined supporting bars 15 secured at their outer ends to the upper rear edge of the box as shown. To the outer end of the board 14 is secured a transversely disposed stop bar 16 the ends of which project beyond the opposite sides of the board and which when in an operative position are adapted to be engaged by stop lugs 17, formed on the rear pintles of the doors, said rear pintles being extended to receive said lugs. When the lugs 17 are in engagement with the ends of the stop bar the doors will be held against tilting and will thus support the animal until the teeter is rocked and the bar thus disengaged from the lugs. On the upper side of the board 14 is a bail shaped threaded bar 18 on which is arranged an adjustable weight 19 having a threaded passage to receive said rod whereby the weight may be screwed back and forth on the rod to balance the board and thus cause the same to swing back to its normal position after being tilted. Loosely connected with the rod 18 is a bait hook 20 the outer end of which is adapted to be inserted through a piece of bait and engaged with an aperture in the end of the board 14 as clearly shown in Fig. 2 of the drawing. By thus arranging the teeter it will be readily seen that the animal after ascending the incline and reaching the top of the box will be attracted to the bait on the inner end of the board 14 and in an effort to reach the bait will pull down on the end of the board thus rocking the same and disengaging the stop bar 16 from the stop lugs 17 on the pintles of doors thus permitting the inner edges of the same to swing downwardly thereby precipitating the animal into the box, after which the teeter will be immediately swung back to an operative position by the weight 19 and the doors immediately closed by the weights 13 on the outer portion thereof.

In order to limit the downward or inward swinging movement of the doors 10 I provide stop pins 21 arranged in the front and rear sides of the box, as shown. The pins 21 obviate any danger of the doors turning over or swinging past a vertical position. On the inner sides of the box below the outer edges of the doors 10 are arranged downwardly inclined inwardly projecting baffle plates or boards 22 which are provided to prevent any possibility of a large animal springing or climbing out of the box, when the doors are opened.

By arranging the operating mechanism herein shown and described it will be readily seen that one animal after another may be caught until the box 1 is full.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described my invention what I claim is:—

1. In a trap of the character described, a box, trap doors pivotally supported on said box, stop lugs formed on the pintles of one end of said doors, a teeter, comprising a board pivotally supported over the inner edges of the doors, a cross bar secured to the outer end of said board and adapted to be engaged with the stop lugs on the pintles of the doors, a balancing weight adjustably secured to said board, means to secure a bait to the inner end of the board whereby the latter will be tilted by an animal in reaching for the bait thus releasing the doors and permitting the latter to precipitate the animal into the box and means to restore the doors to a closed position.

2. In a trap, a box, an incline arranged adjacent to one side of the box, said incline comprising, a triangular frame having its upper inclined side set down below the upper edges of the vertical sides of the incline, thereby forming a compartment, bait holding cleats arranged in said compartment, a screen door arranged over said compartment, said door forming a walk up which the animals are attracted by the bait on said cleats and thus directed to the top of the box, pivoted trap doors adapted to close said box and means whereby the doors are opened by the animal thereon thus precipitating the animal into the box.

In testimony whereof I have hereunto set my hand in the presence of two subscribing witnesses.

WALTER JAMES STEWART.

Witnesses:
A. J. CATON,
T. R. GIBSON.

---

Copies of this patent may be obtained for five cents each, by addressing the "Commissioner of Patents, Washington, D. C."